United States Patent [19]

Nino

[11] Patent Number: 4,914,747

[45] Date of Patent: Apr. 3, 1990

[54] VEHICULAR HEADLAMP

[75] Inventor: Naohi Nino, Shizuoka, Japan

[73] Assignee: Koito Seisakusho Co, Ltd., Japan

[21] Appl. No.: 371,765

[22] Filed: Jun. 27, 1989

[30] Foreign Application Priority Data

Jun. 28, 1988 [JP] Japan ............................... 63-160406

[51] Int. Cl.$^4$ ................................................ B60Q 1/00

[52] U.S. Cl. ...................................... 362/61; 362/297; 313/115; 313/117

[58] Field of Search ........................ 313/115, 117, 111; 362/61, 297, 310

[56] References Cited

U.S. PATENT DOCUMENTS

| | | | |
|---|---|---|---|
| 1,702,746 | 2/1929 | Prichard | 362/61 |
| 4,100,594 | 7/1978 | Gould . | |
| 4,686,610 | 8/1987 | Cibie et al. . | |
| 4,825,343 | 4/1989 | Nakata | 362/61 |

*Primary Examiner*—Carroll B. Dority

*Attorney, Agent, or Firm*—Sughrue, Mion, Zinn, Macpeak & Seas

[57] ABSTRACT

Disclosed herein is a vehicular projector type headlamp. The headlamp comprises a concave light reflector which includes upper and lower reflector parts, each part constituting a part of an ellipsoidal light reflecting surface and having first and second focuses, the upper and lower reflector parts having a common optical axis and having the second focuses located on a common position, the first focus of the upper reflector part being in front of that of the lower reflector part; a first light source positioned at the first focus of the upper reflector part; a second light source positioned at the first focus of the lower reflector part; a shade plate positioned in front of the first and second light sources; and a converging lens arranged in front of the shade plate. The shade plate is arranged flat with respect to the optical axis and arranged in parallel with the optical axis having a front edge thereof positioned just behind the second focus, and the lens has its focus located at the front edge of the shade plate.

16 Claims, 14 Drawing Sheets

VEHICULAR HEADLAMP

BACKGROUND OF THE INVENTION

1. Field of the Invention

The present invention relates in general to vehicular headlamps, and more particularly to vehicular headlamps of a so-called "projector type" which comprises a light source for producing light, a concave reflector for reflecting the light forward, a shade plate located in front of the concave reflector for partially shading and thus contouring the reflected light, and a converging lens located in front of the shade plate for projecting the contoured light beam forward. More specifically, the present invention is concerned with the projector type vehicular headlamp which has two light sources, one being for the high beam and the other being for the low beam.

2. Description of the Prior Art

In order to clarify the task of the present invention, one conventional projector type headlamp "a" will be described with reference to FIGS. 12A, 12B, 13A and 13B of the accompanying drawings.

As is schematically illustrated in FIGS. 12A and 12B, the headlamp "A" comprises a concave reflector "b" including an upper reflector part "c" and a lower reflector part "d". Each part "c" or "d" has a light reflecting layer lined on an ellipsoidal inner surface thereof. That is, the inner surface of each reflector part "c" or "d" constitutes a part of the outer surface of an ellipsoid of revolution. The upper and lower reflector parts "c" and "d" have a common optical axis "X—X" and a common second focus "$F_2$". The first focus "$F_1$" of the upper reflector part "c" is positioned in front of the first focus "$F_1'$" of the lower reflector part "d".

Designated by reference "e" is a filament of an electric lamp which produces light for a low beam. The filament "e" is positioned on the first focus "$F_1$" of the upper reflector part "c" and extends along the optical axis "X—X". Designated by reference "f" is a cover which conceals front and lower portions of the filament "e". Thus, light rays "g" produced by the filament "e" are directed only upward, that is, toward the upper reflector part "c" and reflected forward by the same and converged at the second focus "$F_2$".

Designated by reference "h" is a filament of an electric lamp which produces light for a high beam. The filament "h" is positioned on the first focus "$F_1'$" of the lower reflector part "d" and extends along the optical axis "X—X". Thus, light rays "i" projected downward from the filament "h" are reflected forward by the lower reflector part "d" and converged at the second focus "$F_2$", while, light rays "j" projected upward from the filament "h" are reflected forward by the upper reflector part "c" and thus directed forward passing along paths located above the second focus "$F_2$".

Designated by reference "k" is a shade plate which is arranged perpendicular to the optical axis "X—X". The shade plate includes an upper edge "1" which is, as is seen from FIG. 2, positioned just behind the second focus "$F_2$" and in contact with the optical axis "X—X". Accordingly, light rays directed forward are partially intercepted or contoured by the shade plate "k".

Designated by reference "m" is a converging lens which is positioned in front of the shade plate "k". The lens "m" has its focus "$F_c$" located at generally middle portion of the upper edge "1" of the shade plate "k". Thus, the light beam projected forward from the converging lens "m" has a cross-sectional pattern contoured by the shade plate "k". That is, the converging lens "m" makes an upside-down image of the shade plate "k" in the projected light beam.

When, thus, the filament "e" is energized, the headlamp "a" projects a light beam or low beam which has such a contoured cross-sectional pattern "n" as shown in FIG. 13A. It is to be noted that the upper edge "o" of the pattern "n" is produced by the provision of the upper edge "1" of the shade plate "k".

While, when the other filament "h" is energized, the headlamp "a" projects a light beam or high beam which has such a contoured cross-sectional pattern "p" as shown in FIG. 13B. That is, the pattern "p" comprises an upper portion "q" produced by the light rays "i" from the lower reflector part "d" and a lower portion "r" produced by the light rays "j" from the upper reflector part "c".

However, due to its inherent construction, the headlamp "a" has the following drawbacks.

That is, the high beam produced by the headlamp "a" fails to have a satisfied quantity of light.

Since, in the headlamp "a", the shade plate "k" is arranged perpendicular to the optical axis "X—X" of the light reflector "b", the light rays "i" produced by the filament "h" and reflected forward by the lower reflector part "d" are considerably intercepted by the shade pate "k" during travelling toward the converging lens "m". Intercepting the light rays "i" brings about a wasteful usage of the light rays produced by the light source.

Furthermore, as is understood from FIG. 13B, since the light rays "i" reflected by the lower reflector part "d" and the light rays "j" reflected by the upper reflector part "c" are all used for producing the contoured cross-sectional patterns "q" and "r" which are directed toward a portion below the horizontal line "H—H", the light beam from the headlamp "a" shows a poor illumination ability in illuminating objects positioned above the horizontal line "H—H".

SUMMARY OF THE INVENTION

It is therefore an object of the present invention to provide a projector type headlamp which is free of the above-mentioned drawbacks.

According to the present invention, there is provided a projector type headlamp in which a shade plate is arranged horizontally, that is, flat with respect to an optical axis of a concave reflector.

According to the present invention, there is provided a vehicular headlamp which comprises a concave light reflector which includes upper and lower reflector parts, each part constituting a part of an ellipsoidal light reflecting surface and having first and second focuses, the upper and lower reflector parts having a common optical axis and having the second focuses located on a common position, the first focus of the upper reflector part being in front of that of the lower reflector part; a first light source positioned at the first focus of the upper reflector part; a second light source positioned at the first focus of the lower reflector part; a shade plate positioned in front of the first and second light sources, the shade plate being arranged flat with respect to the optical axis and arranged in parallel with the optical axis having a front edge thereof positioned just behind the second focus; a converging lens arranged in front of the shade plate, the lens having its focus located at the front edge of the shade plate.

BRIEF DESCRIPTION OF THE DRAWINGS

Other objects and advantages of the present invention will become apparent from the following description when taken in conjunction with the accompanying drawings, in which:

FIGS. 1, 2, 3A and 3B are drawings showing a projector type automotive headlamp, which is a first embodiment of the present invention, in which:

FIG. 1 is a schematically illustrated perspective view of the headlamp;

FIG. 2 is a schematically illustrated vertically sectional view of the headlamp;

FIG. 3A is a view of a contoured cross-sectional pattern of a low beam produced by the headlamp; and FIG. 3B is a view of a contoured cross sectional pattern of a high beam produced by the headlamp;

DETAILED DESCRIPTION OF THE INVENTION

Figure 1:
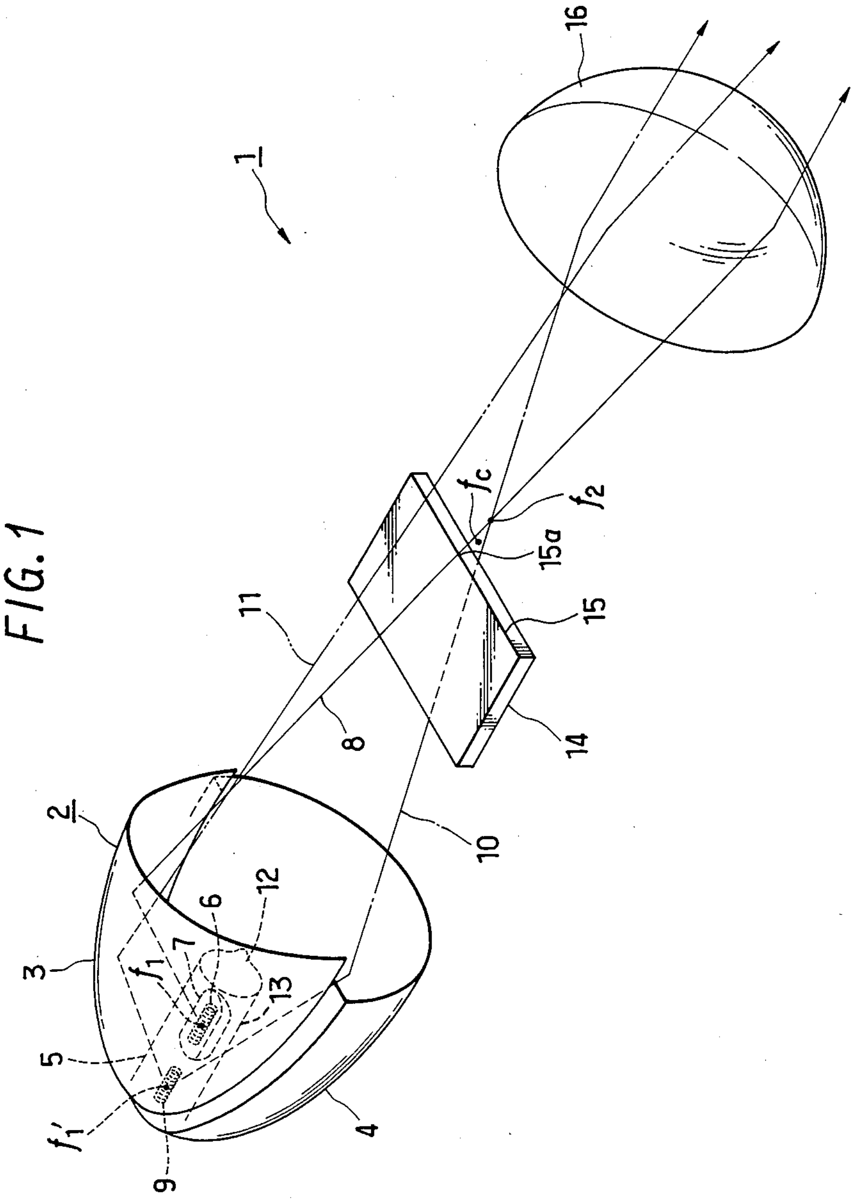
Figure 2:
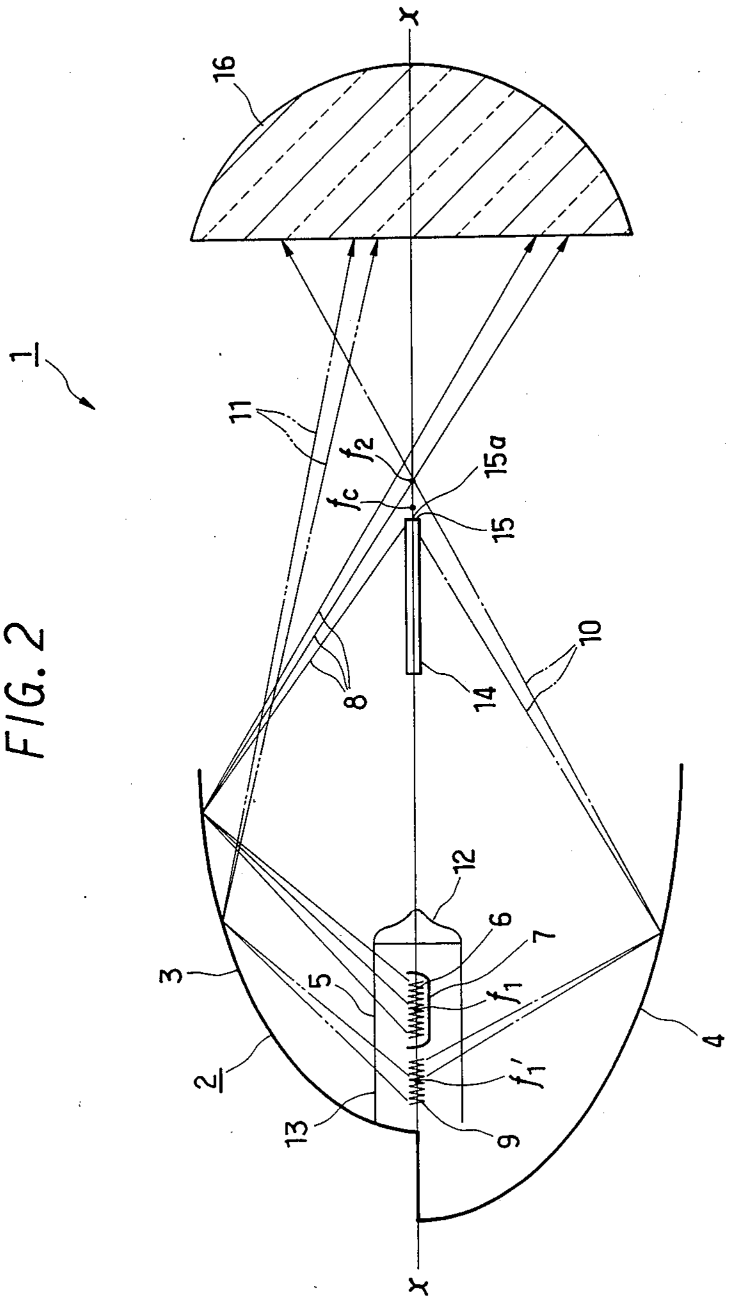

Referring to FIGS. 1, 2, 3A and 3B, there is shown a projector type automotive headlamp 1, which is a first embodiment of the present invention.

Designated by numeral 2 is a concave reflector which comprises an upper reflector part 3 and a lower reflector part 4. Each part 3 or 4 has a light reflecting layer lined on an ellipsoidal inner surface thereof. That is, the inner surface of each reflector part 3 or 4 constitutes a part of the outer surface of an ellipsoid of revolution. The upper and lower reflector parts 3 and 4 have a common optical axis "X—X" and a common second focus "$f_2$". The first focus "$f_1$" of the upper reflector part 3 is positioned in front of the first focus "$f_1'$" of the lower reflector part 4.

Designated by numeral 5 is an electric lamp detachably mounted to the concave reflector 2. If desired, a so-called "European $H_4$ type bulb" may be used.

The electric lamp 5 contains two filaments 6 and 9.

The filament 6 produces light for a low beam. The filament 6 is positioned on the first focus "$f_1$" of the upper reflector part 3 and extends along the optical axis "X—X". Designated by numeral 7 is a cover which covers front and lower portions of the filament 6. Thus, light rays 8 produced by the filament 6 are directed only upward, that is, toward the upper reflector part 3 and reflected forwardly by the part 3 and converged at the second focus "$f_2$".

The filament 9 produces light for a high beam. The filament 9 is positioned on the first focus "$f_1'$" of the lower reflector part 4 and extends along the optical axis "X—X". Thus, light rays 10 projected downward from the filament 9 are reflected forward by the lower reflector part 4 and converged at the second focus "$f_2$", while, light rays 11 projected upward from the filament 9 are reflected forward by the upper reflector part 3 and thus directed forward passing along paths located above the second focus "$f_2$".

Designated by numeral 12 is a light shading film which is lined on a front portion of the electric lamp 5 to block light rays directed thereto.

Designated by numeral 14 is a shade plate of non-transparent material, which has a front edge designated by 15. As shown, the shade plate 14 is arranged to horizontally cross the optical axis "X—X" and arranged in parallel with the axis "X—X" having the middle portion 15*a* of the front edge thereof positioned just behind the second focus "$f_2$". Thus, the flux of the light rays 8 reflected by the upper reflector part 3 has a lower portion intercepted by the shade plate 14, and the flux of the light rays 10 reflected by the lower reflector part 4 has an upper portion intercepted by the shade plate 14.

Designated by numeral 16 is a converging lens which is located in front of the shade plate 14. The converging lens 16 has its focus "$f_c$" located at the middle portion 15*a* of the front edge 15 of the shade plate 14.

Figure 3A:
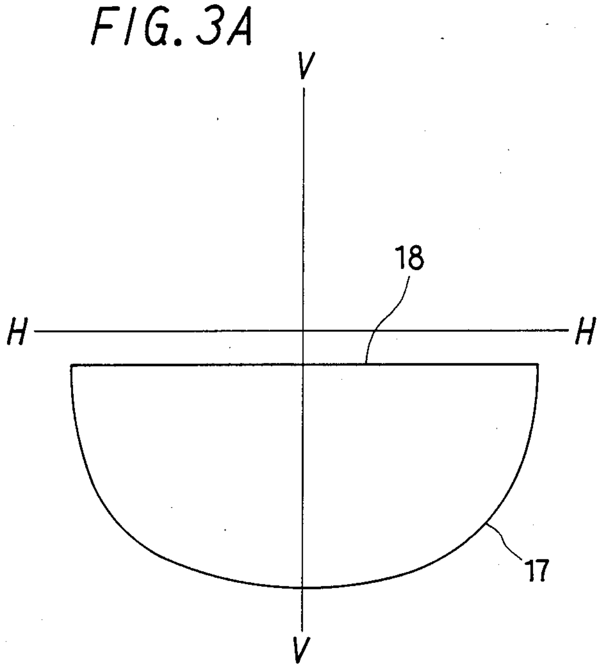
Figure 3B:
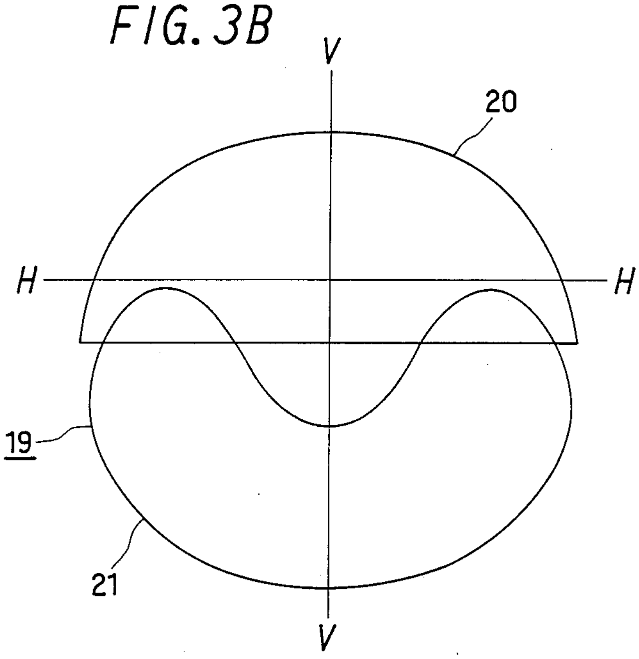

The cross-sectional patterns of low and high beams produced by the headlamp 1 of the first embodiment are illustrated in FIGS. 3A and 3B respectively.

That is, when the filament 6 for the low beam is energized, the cross-sectional pattern 17 as shown in FIG. 3A is produced. It is to be noted that the upper edge 18 of the pattern 17 is caused by the provision of the front edge 15 of the shade plate 14.

While, when the other filament 9 for the high beam is energized, the cross-sectional pattern 19 as shown in FIG. 3B is produced. The pattern 19 comprises an upper part 20 which is produced by the light rays 10 from the lower reflector part 4 and a lower part 21 which is produced by the light rays 11 from the upper reflector part 3.

As is described hereinabove, the upper portion of the flux of light rays 10 reflected by the lower reflector part 4 is intercepted by the shade plate 14, while, the lower portion of said flux is permitted to pass through the shade plate 14. Thus, the light rays passing through the shade plate 14 cause the converging lens 16 to produce a reversed image of the shade plate 14 in the high beam pattern at a position above the horizontal line "H—H".

Accordingly, the high beam produced by the headlamp 1 shows an excellent ability in illuminating objects positioned above the horizontal line "H—H".

Furthermore, since the shade plate 14 is arranged flat with respect to the optical axis of the concave reflector 14, the quantity of light blocked by the shade plate 14 is minimized in the invention.

Figure 4:
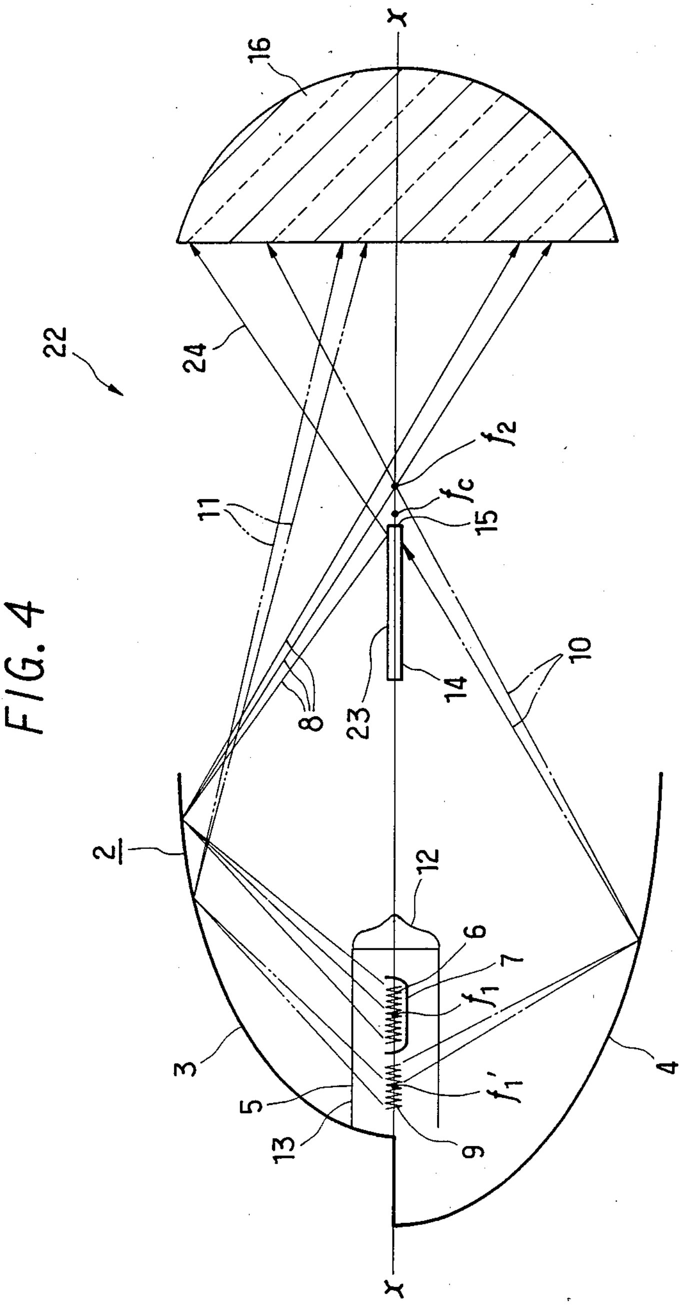
FIG. 4 is a schematically illustrated vertically sectional view of a headlamp of a second embodiment of the present invention.

Referring to FIG. 4, there is shown a headlamp 22 of a second embodiment of the present invention.

The headlamp 22 of this embodiment is substantially the same as that of the first embodiment except for the shade plate 14.

That is, the shade plate 14 employed in this second embodiment has an upper surface 23 lined with a light reflecting layer.

Accordingly, the light rays 24 directed toward the shade plate 14 from the upper reflector part 3 are reflected forwardly upwardly by the light reflecting upper surface 23 thereby increasing the quantity of light in the beam projected from the headlamp 22.

Figure 5A:
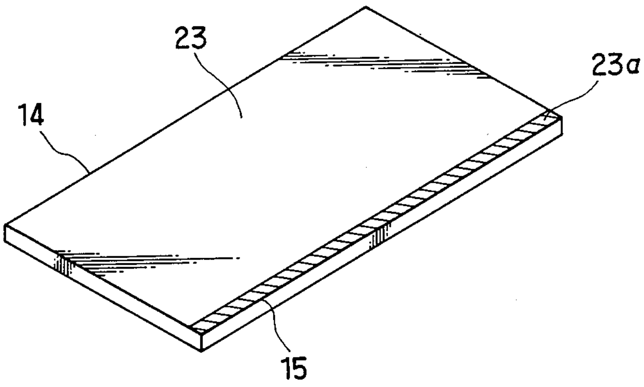
FIG. 5A is a perspective view of a modified shade plate which is usable in the second embodiment.
Figure 5B:
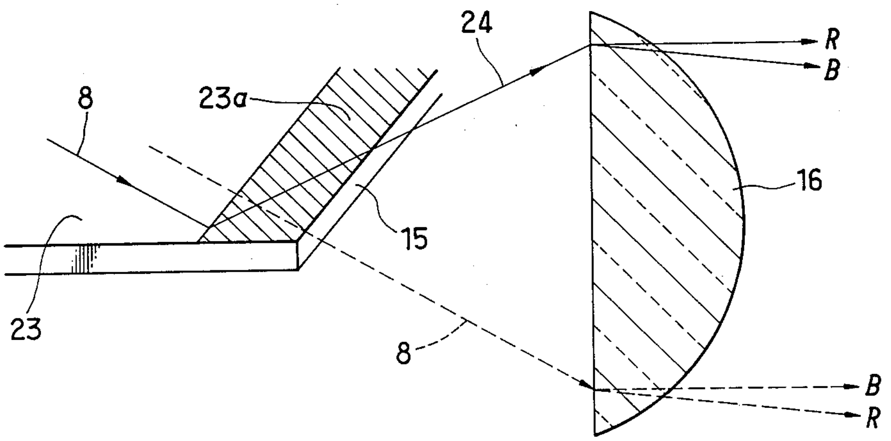
FIG. 5B is a schematic view showing the manner in which the modified shade plate is practically used in the second embodiment.

A modified shade plate 14 is shown in FIGS. 5A and 5B, which is usable in the headlamp 22 of the second embodiment. In this modification, the upper surface 23 of the shade plate 14 is lined with the light reflecting layer except a narrow portion 23*a* which is positioned near and extends along the front edge 15 of the shade plate 14. If desired, a nonreflective paint may be applied to the narrow portion 23*a*. This modification is provided by taking the chromatic aberration of the converging lens 16 into consideration. That is, in this modification, the shade plate 14 is so arranged that a focus of the converging lens 16 with respect to blue light is located at the front edge 15 of the shade plate 14 and another focus of the lens 16 with respect to red light is located at a rear edge of the narrow portion 23*a*. With this measure, the cross-sectional pattern of the projected beam is prevented from having upper and lower edges colored.

Figure 6:
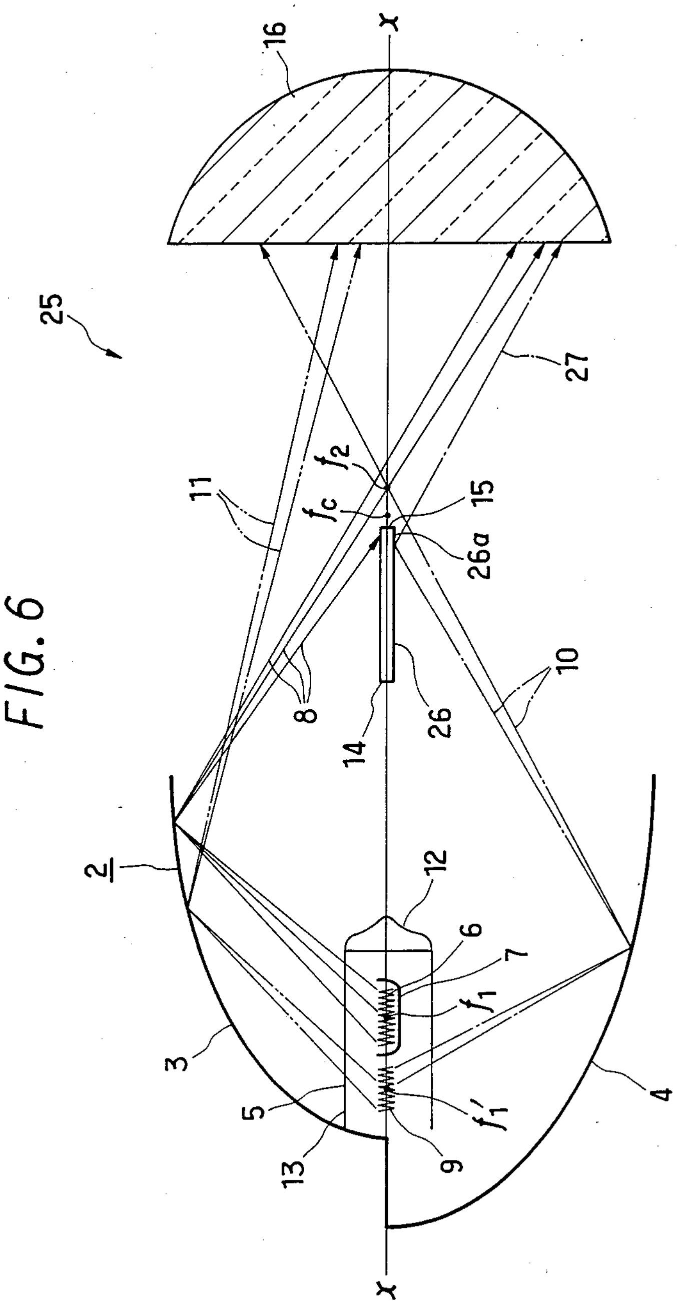
FIG. 6 is a schematically illustrated vertically sectional view of a headlamp of a third embodiment of the present invention.

Referring to FIG. 6, there is shown a headlamp 25 of a third embodiment of the present invention.

The headlamp 25 of this third embodiment is substantially the same as that of the first embodiment except for the shade plate 14.

That is, the shade plate 14 employed in this second embodiment has a lower surface 26 lined with a light reflecting layer.

Accordingly, the light rays 27 directed toward the shade plate 14 from the lower reflector part 4 are reflected forwardly downwardly by the light reflecting lower surface 26 thereby increasing the quantity of light in the beam projected from the headlamp 25.

Figure 7A:
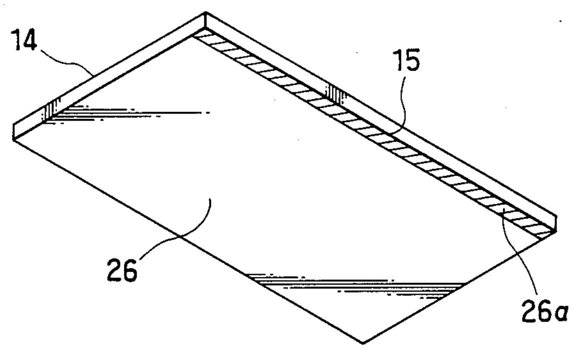
FIG. 7A is a perspective view of a modified shade plate which is usable in the third embodiment.
Figure 7B:
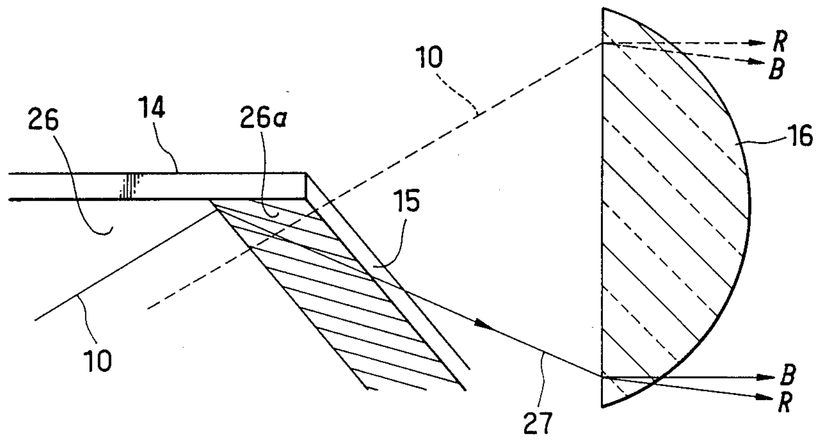
FIG. 7B is a schematic view showing the manner in which the modified shade plate is practically used in the third embodiment.

A modified shade plate 14 is shown in FIGS. 7A and 7B, which is usable in the headlamp 25 of the third embodiment. In this modification, the lower surface 26 of the shade plate 14 is lined with the light reflecting layer except a narrow portion 26*a* which is positioned near and extends along the front edge 15 of the shade plate 14. If desired, a nonreflective paint may be applied to the narrow portion 26*a*. The shade plate 14 is so arranged that a focus of the converging lens 16 with respect to blue light is located at the front edge 15 of the shade plate 14 and another focus of the lens 16 with respect to red light is located at a rear edge of the narrow portion 26*a*. With this measure, the cross-sectional pattern of the projected beam is prevented from having upper and lower edges colored.

If desired, both the upper and lower surfaces 23 and 26 of the shade plate 14 may be lined with light reflecting layers. Furthermore, if necessary, the above-mentioned nonreflective narrow portions 23*a* and 26*a* may be provided in the surfaces 23 and 26.

Figure 8:
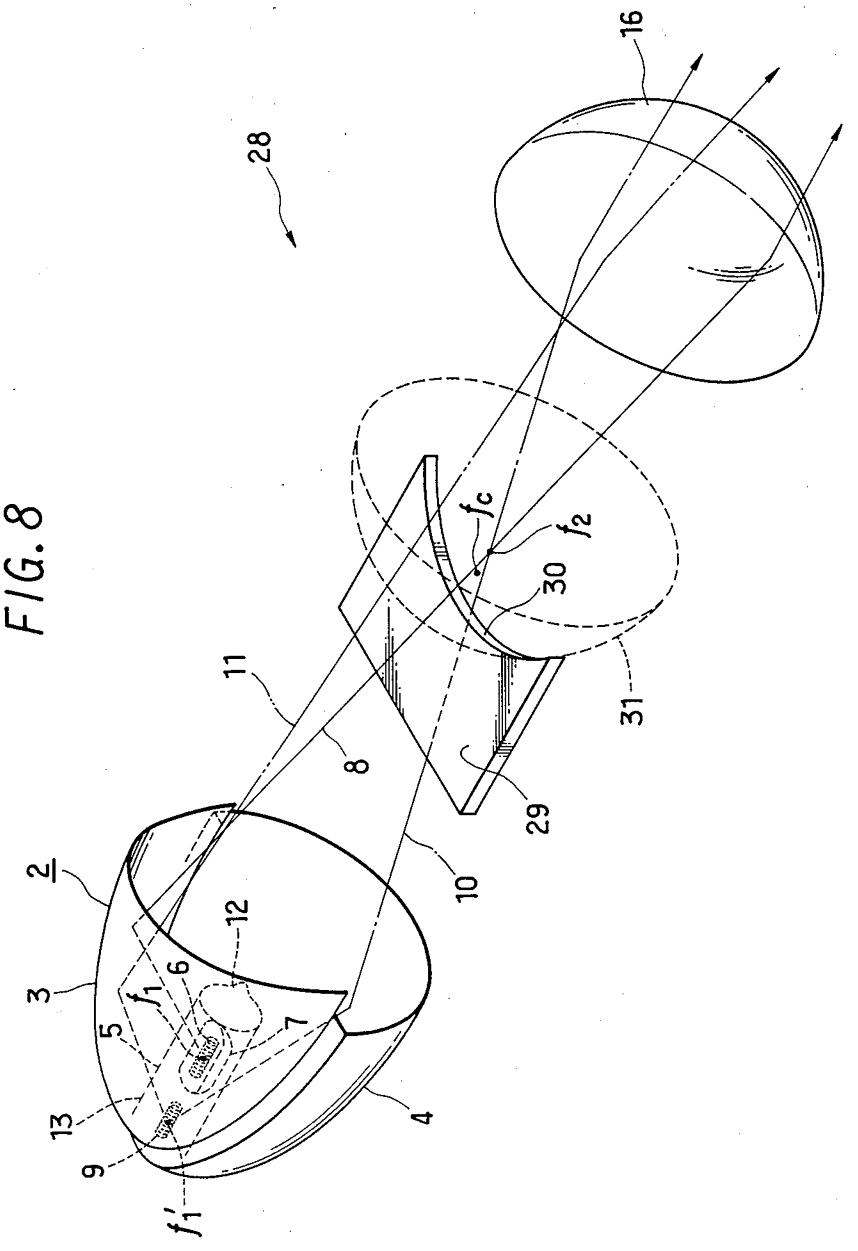
FIG. 8 is a schematically illustrated perspective view of a headlamp of a fourth embodiment of the present invention.

Referring to FIG. 8, there is shown a headlamp 28 of a fourth embodiment of the present invention.

As is shown, a shade plate 14 employed in this fourth embodiment has a front edge portion 30 recessed. The recess is smoothly curved. This measure is employed for dealing with a curved image 31 caused by the spherical aberration of the converging lens 16. With this measure, the upper edge 18 (see FIG. 3A) of the low beam pattern provided by the headlamp 28 is clearly imaged.

If desired, the measures of the above-mentioned second and third embodiments may be applied to the headlamp 28 of the fourth embodiment. That is, the upper and lower surfaces of the recessed shade plate 14 may be lined with the light reflecting layers. Furthermore, if desired, a nonreflective narrow portion may be provided which extends along the recessed front edge 30.

Figure 9A:
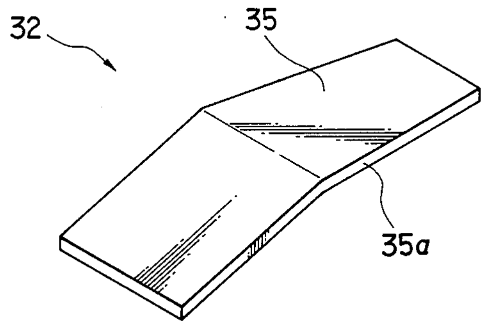
FIGS. 9A, 10A and 11A are perspective views of various shade plates which are also employable in the headlamp according to the present invention.
Figure 9B:
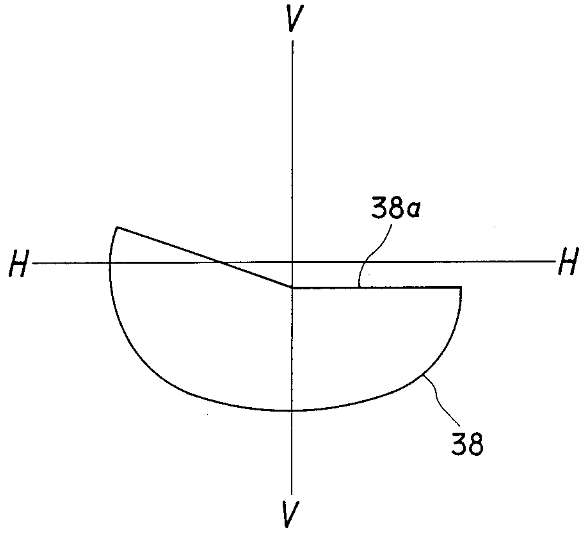
FIGS. 9B, 10B and 11B are views of contoured cross-sectional patterns of light beams which are provided by the shade plates of FIGS. 9A, 10A and 11A, respectively.
Figure 10A:
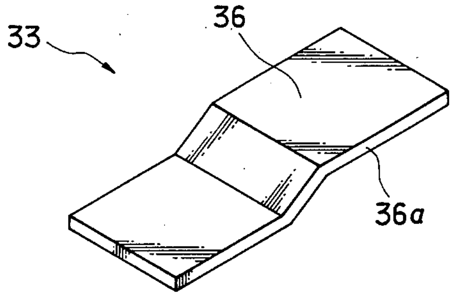
Figure 10B:
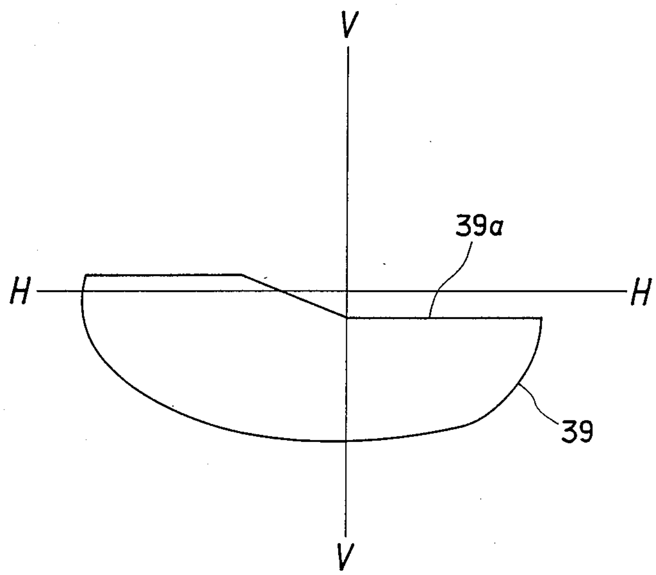
Figure 11A:
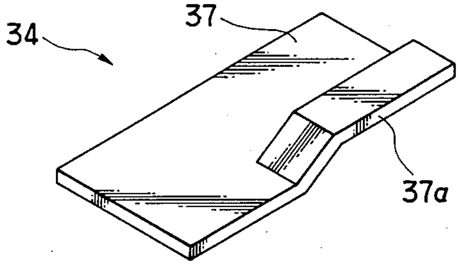
Figure 11B:
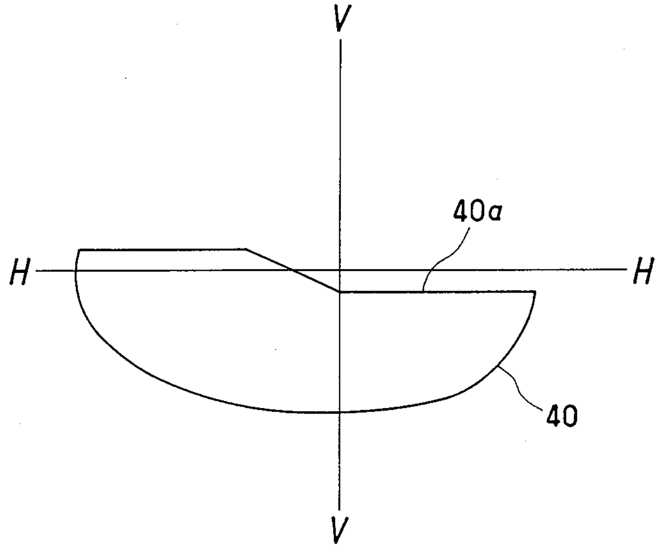
Figure 12A:
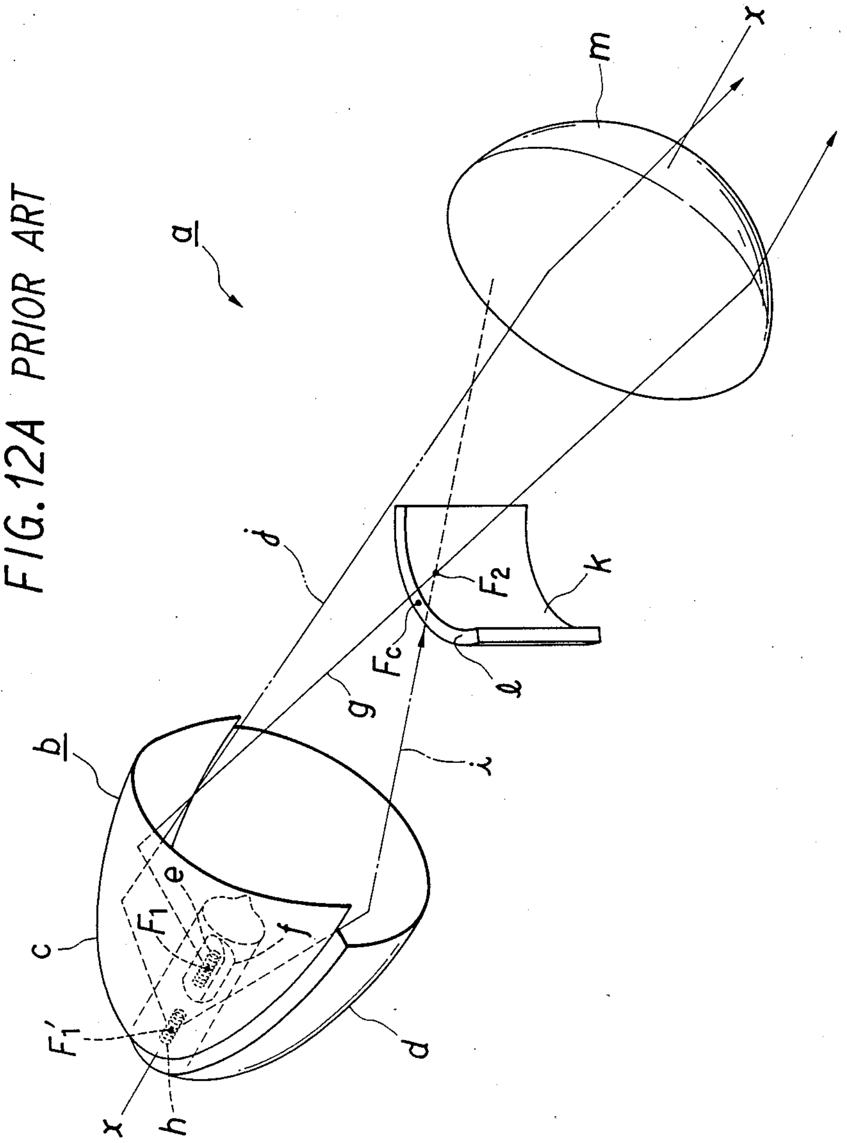
FIG. 12A PRIOR ART
FIGS. 12A and 12B are schematically illustrated perspective and sectional views of a conventional projector type headlamp.
Figure 12B:
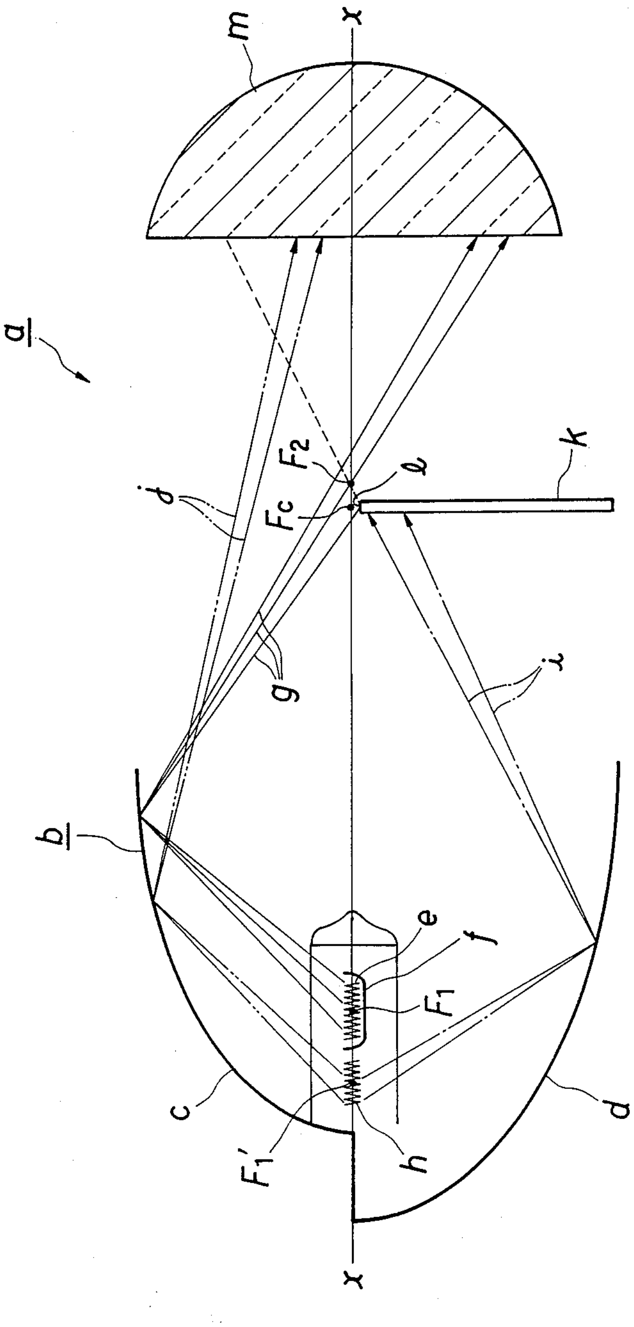
FIG.12B PRIOR ART
Figure 13A:
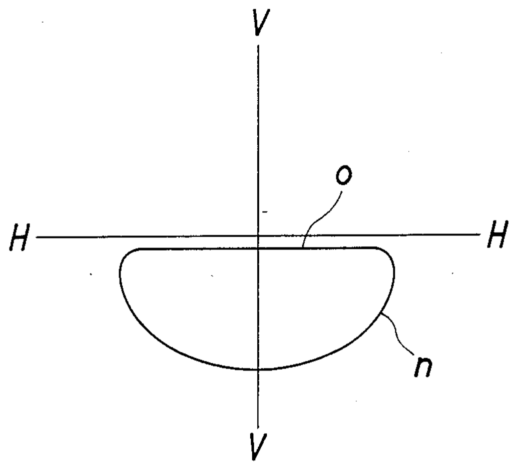
FIG. 13A PRIOR ART
FIG. 13A is a view of a contoured cross-sectional pattern of a low beam produced by the conventional headlamp.
Figure 13B:
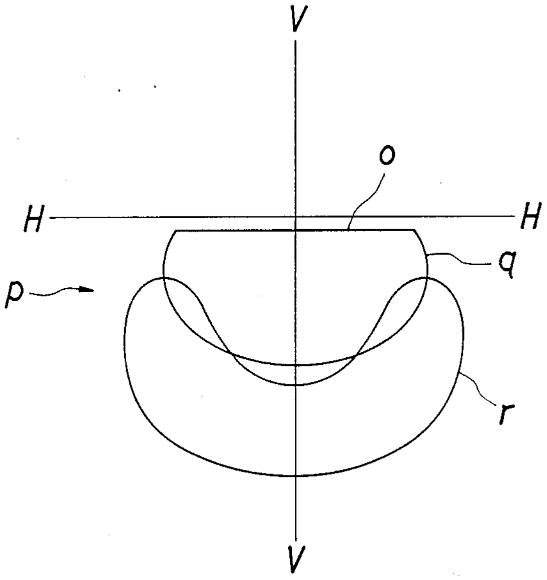
FIG. 13B PRIOR ART
FIG. 13B is a view of a contoured cross-sectional pattern of a high beam produced by the conventional headlamp.

Referring to FIGS. 9A, 10A and 11A, there are shown various types of shade plates 35, 36 and 37 which are used in headlamps 32, 33 and 34 of fifth, sixth and seventh embodiments of the present invention. Each shade plate 35, 36 or 37 has a front edge 35*a*, 36*a* or 37*a* shaped in accordance with the upper edge 38*a*, 39*a* or 40*a* of a desired low beam pattern 38, 39 or 40 (see FIGS. 9B, 10B and 11B) projected by the headlamp 32, 33 or 34. That is, the front edge 35*a* of the shade plate 35 includes two intersecting linear wall portions, the shade plate 36 is constructed of a stepped plate and the shade plate 37 has the front edge 37*a* partially raised.

If desired, the measures of the above-mentioned second, third and fourth embodiments may be applied to the headlamps 32, 33 and 34 of the fifth, sixth and seventh embodiments. That is, the upper and lower surfaces of the shade plate 35, 36 or 37 are lined with the light reflecting layers. Furthermore, if desired, a nonreflective narrow portion may be provided which extends along the front edge 35*a* 36*a* or 37*a*. Furthermore, the front edge 35*a*, 36*a* or 37*a* may be recessed in a manner as is described in the fourth embodiment.

In the following, advantages of the present invention will be itemed.

First, since the shade plate is arranged flat with respect to the optical axis of the concave reflector, the quantity of light blocked by the shade plate is remarkably reduced as compared with the afore-mentioned conventional headlamp in which the shade plate is arranged perpendicular to the optical axis. Thus, the beam projected by the headlamp can have a satisfied quantity of light.

Second, although a part of the light rays from the lower reflector part is blocked by the shade plate, the remainder of the light rays allows the converging lens to project a light beam or high beam toward a position above the horizontal line. Thus, the high beam exhibits a satisfied ability in illuminating objects positioned above the horizontal line.

Third, the headlamp of the present invention can be easily provided by slightly modifying the conventional headlamp. This induces an economical manufacturing of the invention.

What is claimed is:

1. A vehicular headlamp comprising:

a concave light reflector which includes upper and lower reflector parts, each part constituting a part of an ellipsoidal light reflecting surface and having first and second focuses, said upper and lower reflector parts having a common optical axis and having the second focuses located at a common point, the first focus of said upper reflector part being in front of that of said lower reflector part;

a first light source positioned at the first focus of said upper reflector part;

a second light source positioned at the first focus of said lower reflector part;

a shade plate positioned in front of said first and second light sources, said shade plate being arranged flat with respect to said optical axis and arranged in parallel with said optical axis having a front edge thereof positioned just behind said second focus;

a converging lens arranged in front of said shade plate, said lens having its focus located at said front edge of said shade plate.

2. A vehicular headlamp as claimed in claim 1, in which said front edge of said shade plate has a middle portion thereof positioned just behind said second focus, and in which said focus of said converging lens is positioned on said middle portion of the shade plate.

3. A vehicular headlamp as claimed in claim 2, in which said first and second light sources are respective filaments which are contained in a common electric bulb.

4. A vehicular headlamp as claimed in claim 3, in which each filament of said electric bulb extends along said optical axis.

5. A vehicular headlamp as claimed in claim 4, in which lower and front portions of the filament corresponding to said first light source are concealed by a cover.

6. A vehicular headlamp as claimed in claim 5, in which said electric bulb has a front portion coated with a light shading film.

7. A vehicular headlamp as claimed in claim 2, in which at least one of upper and lower surfaces of said shade plate is lined with a light reflecting layer.

8. A vehicular headlamp as claimed in claim 7, in which the light reflecting surface of said shade plate has a narrow nonreflective portion which is positioned near and extends along said front edge of said shade plate.

9. A vehicular headlamp as claimed in claim 8, in which said narrow portion is coated with a nonreflective paint

10. A vehicular headlamp as claimed in claim 7, in which said shade plate is so arranged that a focus of said converging lens with respect to blue light is located at the front edge of said shade plate and another focus of said lens with respect to red light is located at a rear edge of said narrow nonreflective portion.

11. A vehicular headlamp as claimed in claim 2, in which the front edge portion of said shade plate has a smoothly curved recess.

12. A vehicular headlamp as claimed in claim 11, in which at least one of upper and lower surfaces of said shade plate is lined with a light reflecting layer.

13. A vehicular headlamp as claimed in claim 12, in which the light reflecting surface of said shade plate has a narrow nonreflective portion which is positioned near and extends along the recessed front edge of said shade plate.

14. A vehicular headlamp as claimed in claim 2, in which the front edge of said shade plate includes two intersecting linear wall portions.

15. A vehicular headlamp as claimed in claim 2 in which said shade plate is constructed of a stepped plate.

16. A vehicular headlamp as claimed in claim 2 in which said shade plate has the front edge partially raised.

* * * * *